United States Patent
Long et al.

(10) Patent No.: US 9,485,774 B2
(45) Date of Patent: Nov. 1, 2016

(54) EFFICIENT TRANSMISSION OF STAND-ALONE APERIODIC CSI REPORTING FOR LTE CARRIER AGGREGATION

(71) Applicant: Telefonaktiebolaget L M Ericsson (publ), Stockholm (SE)

(72) Inventors: Jianguo Long, Kanata (CA); Ping Yu, Ottawa (CA); Girum Alebachew Fantaye, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 359 days.

(21) Appl. No.: 14/193,025

(22) Filed: Feb. 28, 2014

(65) Prior Publication Data
US 2015/0249998 A1 Sep. 3, 2015

(51) Int. Cl.
| | |
|---|---|
| H04W 72/08 | (2009.01) |
| H04L 5/00 | (2006.01) |
| H04W 28/04 | (2009.01) |
| H04W 72/04 | (2009.01) |
| H04W 24/02 | (2009.01) |
| H04W 72/12 | (2009.01) |

(52) U.S. Cl.
CPC ............ *H04W 72/085* (2013.01); *H04L 5/001* (2013.01); *H04L 5/0057* (2013.01); *H04W 24/02* (2013.01); *H04W 72/1284* (2013.01)

(58) Field of Classification Search
None
See application file for complete search history.

(56) References Cited

U.S. PATENT DOCUMENTS

| | | | |
|---|---|---|---|
| 2011/0249578 A1 | 10/2011 | Nazar et al. | |
| 2012/0140708 A1 | 6/2012 | Choudhury et al. | |
| 2013/0195045 A1 | 8/2013 | Papasakellariou et al. | |
| 2013/0301548 A1* | 11/2013 | Etemad | H04W 76/048 370/329 |
| 2015/0103774 A1* | 4/2015 | Nagata | H04B 7/024 370/329 |

OTHER PUBLICATIONS

Francesco Davide Calabrese. "Scheduling and Link Adaptation for Uplink SC-FDMA Systems." Dissertation submitted to the Faculty of Engineering, Science and Medicine of Aalborg University; pp. 1-131; Apr. 2009; Aalborg, Denmark.
R. L. Graham. "Bounds on Multiprocessing Timing Anomalies." SIAM Journal on Applied Mathematics; Retrieved from the Internet: URL://http://links.jstor.org/sici?sici=0036-1399%28196903%2917%3A2%3C416%3ABOMTA%3E2.0.CO%3B2-E [retrieved Nov. 6, 2009]; Mar. 1969; pp. 416-429; vol. 17, No. 2; Society for Industrial and Applied Mathematics.

* cited by examiner

*Primary Examiner* — Marcus R. Smith
*Assistant Examiner* — Saba Tsegaye
(74) *Attorney, Agent, or Firm* — Coats & Bennett, P.L.L.C.

(57) ABSTRACT

The transmission of stand-alone, aperiodic CSI reports from a UE in carrier aggregation in an LTE network is optimized. The coding rate is indirectly controlled by varying the number of RBs allocated for the CSI report transmission. Two sets of serving cells are established, and the payload of each set is approximated. For each allowable number of RBs and each payload size, a threshold SINR is determined and stored. An initial number of RBs is selected, based on the number of cells. The actual SINR is measured, and compared to the threshold SINR for the number of RBs and payload size. The number of RBs to be allocated is varied based on the comparison, by varying an index into an array of allowable numbers of RBs. Link adaptation is performed based on observed decoding errors, in an outer loop control algorithm that prevents wind up. An optimization for the particular case of one PCell and one SCell is also presented.

22 Claims, 10 Drawing Sheets

EFFICIENT TRANSMISSION OF STAND-ALONE APERIODIC CSI REPORTING FOR LTE CARRIER AGGREGATION

FIELD OF INVENTION

The present invention relates generally to wireless telecommunications, and in particular to the transmission of stand-alone aperiodic CSI reporting for carrier aggregation in LTE networks.

BACKGROUND

Wireless telecommunication networks are well known and widely deployed. The $3^{rd}$ Generation Partnership Project (3GPP), a collaboration of telecommunications standard development organizations, publishes and maintains the technical standards defining the structure and operation of modern wireless telecommunication networks. Long Term Evolution (LTE) is a 3GPP standard for a $4^{th}$ generation (4G) wireless communication network based on GSM/EDGE and UMTS/HSPA network technologies. LTE is specified in 3GPP Releases 8-10, and has been deployed since 2010. LTE support high data rates and low latency, and features all-IP network architecture, with only eNode B (base station) fixed nodes in the RAN, providing wireless communication service to a plurality of user equipment (UE), such as cellular telephones, smartphones, mobile/tablet computers, and the like. LTE supports numerous options to increase flexibility of deployment, including time (TDD) or frequency (FDD) division duplex operation; spectrum flexibility with support for 1.4 MHz, 3 MHz, 5 MHz, 10 MHz, 15 MHz, and 20 MHz bandwidth carriers; the coexistence of macro, femto, and pico cells covering varying geographic areas; and support for advanced operating technologies such as high speed shared packet channels, MIMO operation, and carrier aggregation.

FIG. 1 depicts a high-level, functional block diagram of an LTE wireless communication network 10. A Radio Access Network (RAN) 12, e.g., E-UTRAN, comprises one or more base stations 14, known in LTE as eNodeBs. Each eNodeB 14 provides wireless communication service to a plurality of User Equipment (UE) 16 within a geographical area, or cell 18. A core network 20 comprises a plurality of communicatively-linked nodes, such as a Mobility Management Entity (MME) and Serving Gateway (S-GW) 22. The MME/S-GW 22 connects to numerous nodes (not all of which are depicted for simplicity), including a Packet Data Network Gateway (PDN-GW) 24. The PDN-GW 24 provides connectivity to packet data networks such as the Internet 26, and through an IP Multimedia Subsystem (IMS) 28 to the Public Switched Telephone Network (PSTN) 30.

LTE uses Orthogonal Frequency Division Multiplex (OFDM) modulation in the downlink, and DFT-spread OFDM in the uplink. The basic LTE downlink physical resource can thus be seen as a time-frequency grid as illustrated in FIG. 2. Each resource element corresponds to one OFDM subcarrier (15 KHz) during one OFDM symbol interval.

In the time domain, LTE downlink transmissions are organized into radio frames of 10 ms, each radio frame consisting of ten equally-sized subframes of length $T_{subframe}=1$ MS, as illustrated in FIG. 3.

Resource allocation in LTE is described in terms of resource blocks (RB), where a resource block corresponds to one slot (0.5 ms) in the time domain and 12 contiguous subcarriers in the frequency domain. Resource blocks are numbered in the frequency domain, starting with 0 from one end of the system bandwidth.

Carrier aggregation (CA) is a way to dynamically increase the bandwidth available to a UE. In carrier aggregation, up to five spread-spectrum carriers, referred to as component carriers (CC), may be assigned to a UE. For example, FIG. 4 depicts five 20 MHz carriers aggregated to achieve 100 MHz of bandwidth. In general, the component carriers may be of different bandwidths, and may be contiguous or non-contiguous in frequency. Carriers may be aggregated in the uplink (UL) as well as downlink (DL), although the number of UL carriers must be equal to or less than the number of DL carriers. Component carriers are also referred to as cells (not to be confused with the use of that term to describe the geographic extent of a base station's coverage). Each UE in CA has one primary serving cell (PCell), and may be assigned as many secondary serving cells (SCell) as the UE is able to support.

To perform link adaptation, in which the modulation, coding, and other signal and protocol parameters are selected to match the current radio link conditions, a serving base station must obtain information about the downlink channel quality. It obtains this information through Channel State Information (CSI) reports from UE, which assesses the DL channel by processing reference symbols (also known in the art as pilot symbols) transmitted in the DL, of which the data pattern are known a priori. LTE defines both periodic and aperiodic CSI reporting. Aperiodic reports are more desirable for DL adaption due to the flexibility on demands of scheduling time and a larger report size, which may carry more information. An aperiodic CSI report is sent over Physical Uplink Shared Channel (PUSCH) and is scheduled by eNodeB when deemed necessary. The aperiodic CSI report for a UE can be sent without uplink data, which is referred to as a stand-alone aperiodic CSI report. A stand-alone CSI report is scheduled either because the uplink channel condition is not good enough for data and control information multiplexing, or because the UE has no UL data to send when the eNodeB requires updated DL channel conditions for DL data transmission.

LTE specifies that when a UE is in carrier aggregation, and aperiodic CSI reports for multiple serving cells are scheduled in the same subframe, the UE shall concatenated all the cell CSI reports into one single aggregated CSI report. 3GPP Release 10 specifies a CSI request field by which an eNodeB requests CSI from a UE in carrier aggregation, by requesting CSI for its own DL link, or for one of two sets of serving cells; the sets are configured by higher layers, such as Radio Resource Control (RRC) signaling.

For stand-alone aperiodic CSI report, LTE allows up to 4 RBs for single serving cell CSI report and up to 20 RBs for multiple serving cell CSI reports, with no further specification or restriction. An LTE network could achieve more robust and bandwidth-efficient scheduling with a systematic approach, at the eNodeB, for the scheduling, bandwidth allocation and link adaptation of stand-alone aperiodic CSI reports by UE in CA.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, the transmission of stand-alone, aperiodic CSI reports from a UE in CA in an LTE network is optimized for efficiency while meeting predetermined quality goals. This is accomplished by indirectly controlling the coding rate (the modulation type is assumed constant). The coding rate is controlled by varying the number of RBs allocated for the CSI report transmission. The cells aggregated to the UE are divided roughly equally into two sets, and the payload of each set is approximated. For each allowable number of RBs and each payload size, a threshold metric of channel quality, such as SINR, is determined, such as via simulation or operational measurement. An initial number of RBs is selected, based on the number of cells in a CSI report. The actual channel quality is measured, and may be averaged and filtered. The measured channel quality metric is compared to the threshold metric for the number of RBs and payload size. The number of RBs to be used for the CSI transmission is then varied based on the comparison, by varying an index into an array of allowable numbers of RBs. To account for the fact that the stored, threshold channel quality metrics may not reflect real-world conditions, decoding errors are monitored, and the measured channel quality is varied based on the incidence of decoding errors. An outer loop control algorithm is employed which prevents wind up.

In one embodiment, the special case of a UE in CA with one PCell and one SCell is optimized. One of the PCell or SCell that does not issue to the UE a scheduling grant containing a CSI request is assigned to one set of serving cells; both the PCell and SCell are assigned to a second set. The number of RBs available is fixed, and within the number that is allowed for a CSI report for a single cell. When it is time for a stand-alone, aperiodic CSI report from a UE for either cell, a measured channel quality metric, such as SINR, is compared to a threshold channel quality metric for the fixed number of RBs and an approximation of the payload size for the second set of serving cells. If the measured channel quality metric exceeds the threshold, a CSI report for the second cell (both PCell and SCell) is scheduled. Otherwise, a CSI report is scheduled for the one of PCell and SCell having the longest elapsed time since a prior report.

One embodiment relates to a method, performed by a bandwidth allocation processing circuit in a node of a 3GPP LTE wireless communication network, of allocating bandwidth for a UE in carrier aggregation to transmit a stand-alone, aperiodic CSI report. A number of cells for which the UE is to transmit a CSI report, a payload size of the CSI report, and a measured uplink channel quality metric $Z_{MEASURED}$ are determined. In response to the number of cells, an initial number of resource blocks (RB) that can be allocated for a CSI report, and a maximum allowable number of RBs, are selected. $Z_{MEASURED}$ is compared to a predetermined threshold channel quality metric $Z_{THRESHOLD}$ for the currently selected number of RBs and the payload size. In response to each comparison, the number of RBs selected is decreased if $Z_{MEASURED} > Z_{THRESHOLD}$ and the number of RBs selected is increased if $Z_{MEASURED} < Z_{THRESHOLD}$ and the comparison is repeated with the value of $Z_{THRESHOLD}$ obtained using the changed number of RBs. The currently selected number of RBs is allocated for transmission of the CSI report if $Z_{MEASURED} = Z_{THRESHOLD}$, if $Z_{MEASURED} > Z_{THRESHOLD}$ and decreasing the number of RBs would cause $Z_{MEASURED} < Z_{THRESHOLD}$, or if $Z_{MEASURED} < Z_{THRESHOLD}$ and either the UE has reached maximum power or the currently selected number of RBs is the maximum allowable number of RBs.

Another embodiment relates to a method of transmitting a stand-alone, aperiodic CSI report for a UE in carrier aggregation wherein the UE is assigned one PCell and one SCell, the method performed by a processing circuit in a node of a 3GPP LTE wireless communication network. One of the PCell and SCell is assigned to a first set of serving cells, and both PCell and SCell are assigned to a second set of serving cells. A number of resource blocks (RB) to be used to transmit the CSI report and a payload size of a CSI report for the second set are determined. A threshold channel quality metric $Z_{THRESHOLD}$ for the second set is also determined, based on the payload size. The times elapsed since the last aperiodic CSI report from the UE for PCell and SCell are monitored. A measured uplink channel quality metric $Z_{MEASURED}$ is obtained, and compared to $Z_{THRESHOLD}$. If $Z_{MEASURED} >= Z_{THRESHOLD}$ a CSI report from the UE for the second set is requested. If $Z_{MEASURED} < Z_{THRESHOLD}$ a CSI report from the UE for the one of PCell and SCell having the longest elapsed time since the last report is requested. Requesting a CSI report comprises issuing a scheduling grant, containing a CSI request, from the serving cell other than that in the first set. The CSI request specifies the requesting cell, the first set, or the second set.

Yet another embodiment relates to a node operative in a 3GPP LTE wireless communication network and operative to perform a process of allocating bandwidth for a UE in carrier aggregation to transmit a stand-alone, aperiodic CSI report. The node includes a network communication interface and a wireless transceiver operatively connected to one or more antennae. The node also includes a controller circuit operatively connected to the network communication interface and wireless transceiver; and memory operatively connected to the controller circuit. The controller circuit is operative to determine a number of cells for which the UE is to transmit a CSI report, a payload size of the CSI report, and a measured uplink channel quality metric $Z_{MEASURED}$. In response to the number of cells, the controller circuit is operative to select an initial number of resource blocks (RB) that can be allocated for a CSI report, and a maximum allowable number of RBs. The controller circuit compares $Z_{MEASURED}$ to a predetermined threshold channel quality metric $Z_{THRESHOLD}$ for the currently selected number of RBs and the payload size. In response to each comparison, the controller circuit decreases the number of RBs selected if $Z_{MEASURED} > Z_{THRESHOLD}$ and increases the number of RBs selected if $Z_{MEASURED} < Z_{THRESHOLD}$) and repeats the comparison with the value of $Z_{THRESHOLD}$ obtained using the changed number of RBs. The controller circuit then allocates the currently selected number of RBs for transmission of the CSI report if $Z_{MEASURED} = Z_{THRESHOLD}$; if $Z_{MEASURED} > Z_{THRESHOLD}$ and decreasing the number of RBs would cause $Z_{MEASURED} < Z_{THRESHOLD}$; or if $Z_{MEASURED} < Z_{THRESHOLD}$ and either the UE has reached maximum power or the currently selected number of RBs is the maximum allowable number of RBs.

Still another embodiment relates to a node operative in a 3GPP LTE wireless communication network and operative to perform a process of allocating bandwidth for a UE in carrier aggregation to transmit a stand-alone, aperiodic CSI report, wherein the UE assigned PCell and one SCell. The node includes a network communication interface and a wireless transceiver operatively connected to one or more antennae. The node also includes a controller circuit operatively connected to the network communication interface and wireless transceiver, and memory operatively connected to the controller circuit. The controller circuit is operative to assign a one of the PCell and SCell to a first set of serving cells and assign both PCell and SCell to a second set of serving cells. The controller circuit is also operative to determine the number of resource blocks (RB) to be used to transmit the CSI report and the payload size of a CSI report for the second set. The controller circuit then determines a threshold channel quality metric $Z_{THRESHOLD}$ for the second set, based on the payload size. The controller circuit monitors the times elapsed since the last aperiodic CSI report from the UE for PCell and SCell. The controller circuit obtains a measured uplink channel quality metric $Z_{MEASURED}$, and compares $Z_{MEASURED}$ to $Z_{THRESHOLD}$. If $Z_{MEASURED}>=Z_{THRESHOLD}$ the controller circuit requests a CSI report from the UE for the second set. If $Z_{MEASURED}<Z_{THRESHOLD}$ the controller circuit requests a CSI report from the UE for the one of PCell and SCell having the longest elapsed time since the last report. Requesting a CSI report comprises issuing a scheduling grant, containing a CSI request, from the serving cell other than that in the first set, the CSI request specifying one of the requesting cell, the first set, or the second set.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
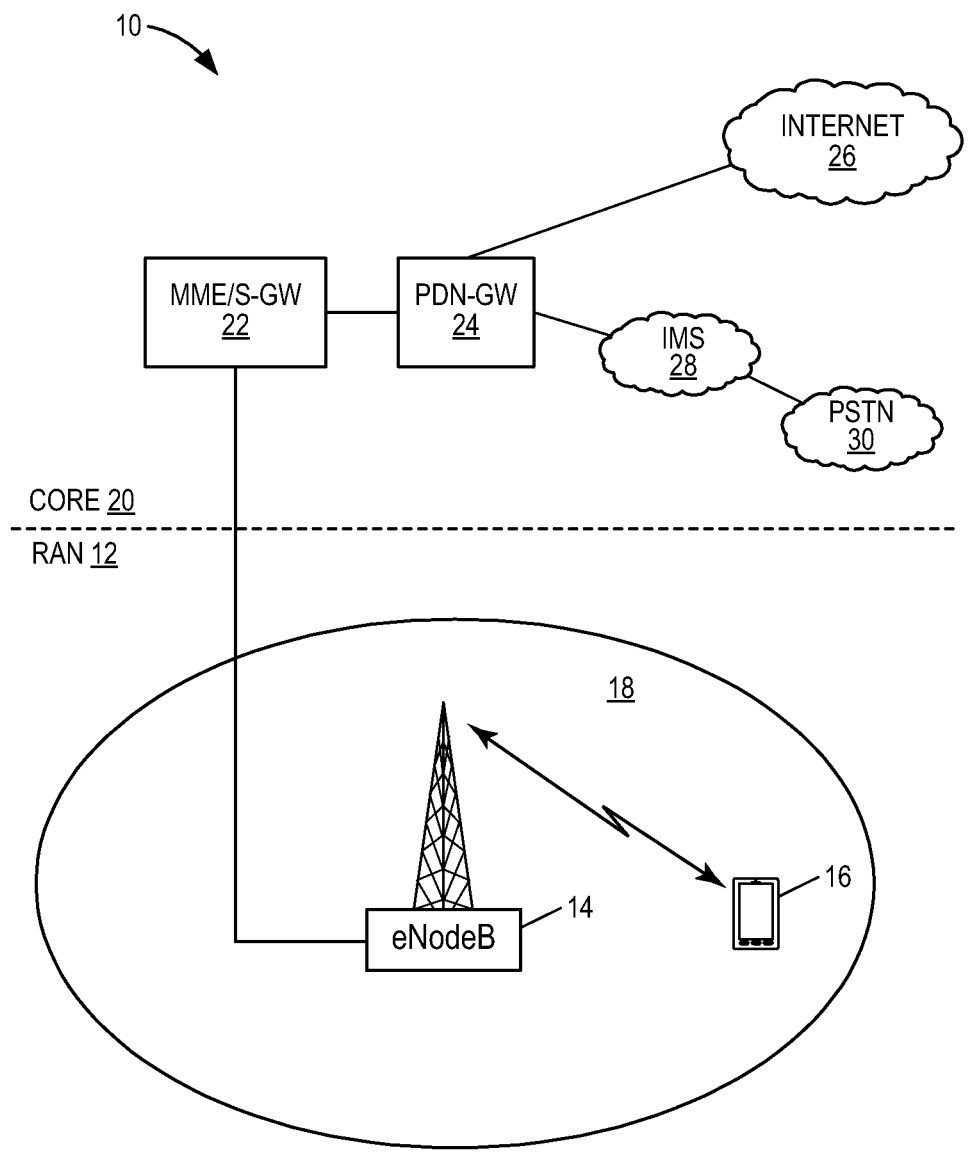
FIG. 1 is a functional block diagram of an LTE wireless communication network.
Figure 2:
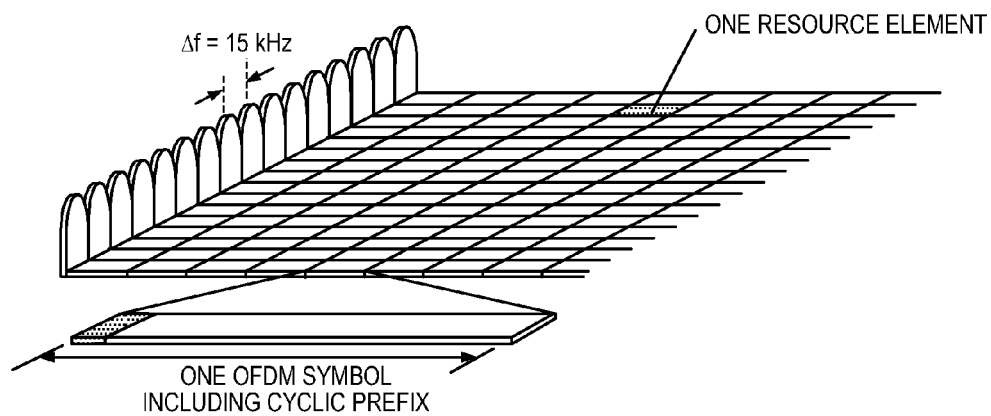
FIG. 2 is a time-frequency diagram of an OFDM downlink signal.
Figure 3:
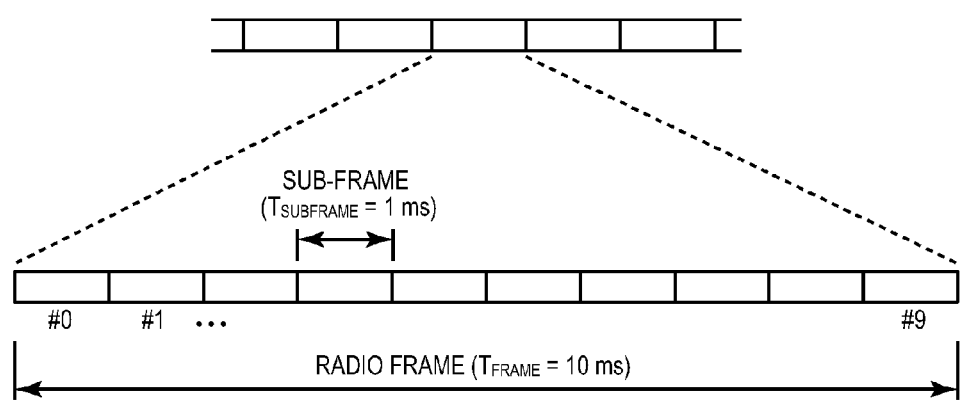
FIG. 3 is a graph depicting LTE frames and subframes.
Figure 4:
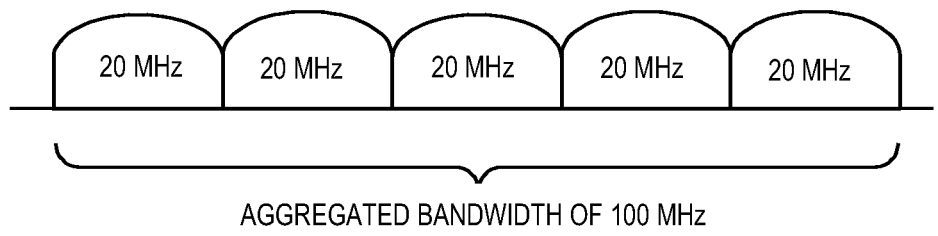
FIG. 4 is a frequency graph depicting carrier aggregation.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

LTE defines five CSI reporting modes for aperiodic CSI reports, depending on whether the UE selects or is configured with sub-bands, and whether and what type of Precoding Matrix Indicator (PMI) information is included. These are known in the specifications as modes 1-2, 2-0, 2-2, 3-0, and 3-1. For more information, refer to 3GPP TS 36.213, "Evolved Universal Terrestrial Radio Access (E-UTRA); Physical layer procedures," Table 7.2.1-1. The bit length of each CSI report for a serving cell depends on the CSI report mode, transmission mode, cell bandwidth, rank, and number of antenna ports. The bit length ranges from 8 to 66 bits. In CA, from one to five CSI reports are concatenated into a single aggregated CSI report. Hence, the payload size of CSI report may range from $O_{CQI, MIN}=1\times8=8$ bits to $O_{CQI,MAX}=5\times66=330$ bits.

A CSI report request is indicated by a UL grant. 3GPP Release 10 defines two bits of the UL grant as a CSI Request field. These bits are defined in 3GPP TS 36.213, "Evolved Universal Terrestrial Radio Access (E-UTRA); Physical layer procedures," Table 7.2.1-1A, reproduced below:

TABLE 1

CSI Request Field, 3GPP Release 10

| Value of CSI request field | Description |
| --- | --- |
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

The serving cell c in the Table 1 is the cell issuing the uplink grant containing the aperiodic CSI trigger. Such configuration has been communicated to the UE, such as via RRC messages. See 3GPP TS 36.331, "Evolved Universal Terrestrial Radio Access (E-UTRA); Radio Resource Control (RRC); Protocol specification."

3GPP standards require that when an aperiodic CSI report without data for one serving cell is triggered, the number $N_{PRB}$ of RB allocated shall satisfy $N_{PRB} \le 4$. Furthermore, if an aperiodic report for more than one serving cell is triggered, $N_{PRB}$ shall satisfy $N_{PRB} \le 20$. The number $N_{PRB}$ of RB shall also fulfill $$N_{PRB}=2^{\alpha_2} \cdot 3^{\alpha_3} \cdot 5^{\alpha_5} \le N_{RB}^{UL}$$

where $\alpha_2, \alpha_3, \alpha_5$ is a set of non-negative integers. We shall represent the valid number of RBs allocated in increasing order for stand-alone aperiodic CSI report with multiple cells as an array B=[1, 2, 3, 4, 5, 6, 8, 9, 10, 12, 15, 16, 18, 20]. The dimension of B is $N_2$=14. When a CSI report relates only to a single cell, only the first four elements in B are valid, and the effective dimension of B is $N_1$=4. The resource elements (RE) in the RBs allocated will first be assigned to Rank Indicator (RI) and then all remaining REs will be assigned to coded Channel Quality Information (CQI)/Precoding Matrix Information (PMI).

3GPP thus allows up to 4 RBs for a single serving cell CSI report and up to 20 RBs for multiple serving cell CSI reports. However, no further specification or restriction is placed on the number of RBs allowed for CSI reports. According to embodiments of the present invention, the number of RBs allocated to stand-alone aperiodic CSI reports for a UE in CA is determined to minimize the bandwidth required, and to optimize system performance. This is achieved by controlling the number of RBs allocated to a CSI report, which indirectly controls the coding rate employed to fit the transmission into the number of RBs.

Scheduling of Aperiodic CSI Reporting

As described above, in addition to the serving cell c, two other sets of serving cells for CSI reporting may be defined. A good distribution of serving cells into the $1^{st}$ and $2^{nd}$ sets is the first step to achieve efficient scheduling for aperiodic CSI reporting.

Different optimization criteria may be used, based on the channel condition. The CSI report payload balancing between $1^{st}$ set and $2^{nd}$ set of serving cells is suitable for most cases. In particular, when the uplink channel condition of current serving cell c for the UE is poor or mediocre, CSI payload balancing allows CSI report transmission that is as robust as possible with limited UE power.

Figure 5:
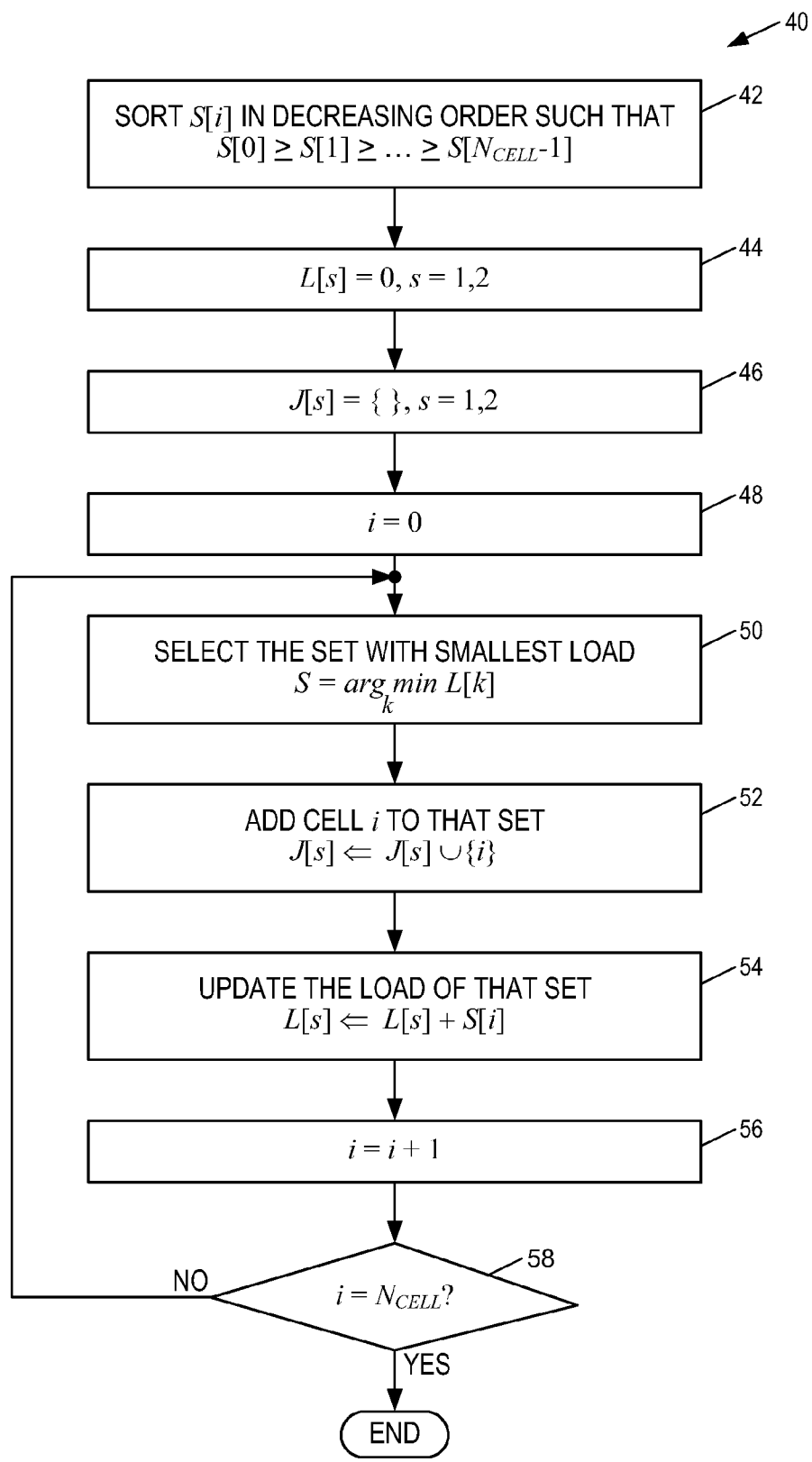
FIG. 5 is a flow diagram of a method of determining sets of cells.

For each cell, the largest possible size of a cell CSI report can be determined based on the CSI report mode, the maximum rank for CSI report mode, the cell bandwidth, the transmission mode, and the number of antenna ports. Consider a UE configured with $N_{CELL}$ serving cells. Let largest possible size of CSI report for cell i be S[i], i=0, 1, . . . , $N_{CELL}$−1. The CSI report sets can be constructed by using a sorted greedy scheduling algorithm, to balance the load between the two sets. This process is described with reference to FIG. 5.

To initialize the process 40, the CSI reports are first sorted by maximum potential size S[i], in decreasing order such that S[0]≥S[1]≥ . . . ≥S[$N_{CELL}$−1] (block 42). The sum of these bit sizes S[i] over all of the cells assigned to a set is referred to as the load of that set. The loads of all (i.e., both) sets of serving cells are initialized to zero: L[s]=0, s=1, 2 (block 44). The two sets are initialized to be empty: J[s]={ }, s=1, 2 (block 46), and an index i is initialized to zero (block 48).

In an iterative loop, the set having the smallest payload is ascertained:

$$s = \mathrm{argmax}_k L[k]$$

(block 50). Cell i is added to the corresponding working set: J[s]⇐J[s]∪{i} (block 52), and the load of that set is updated: L[s]⇐L[s]+S[i] (block 54). The index i is incremented (block 56), and if all of the cells have not been considered (block 58), the loop is repeated; otherwise, it ends. This process balances the payloads between each of the two sets. This configuration is communicated to the UE, such as by a RRC reconfiguration message. See 3GPP TS 36.213.

Figure 6:
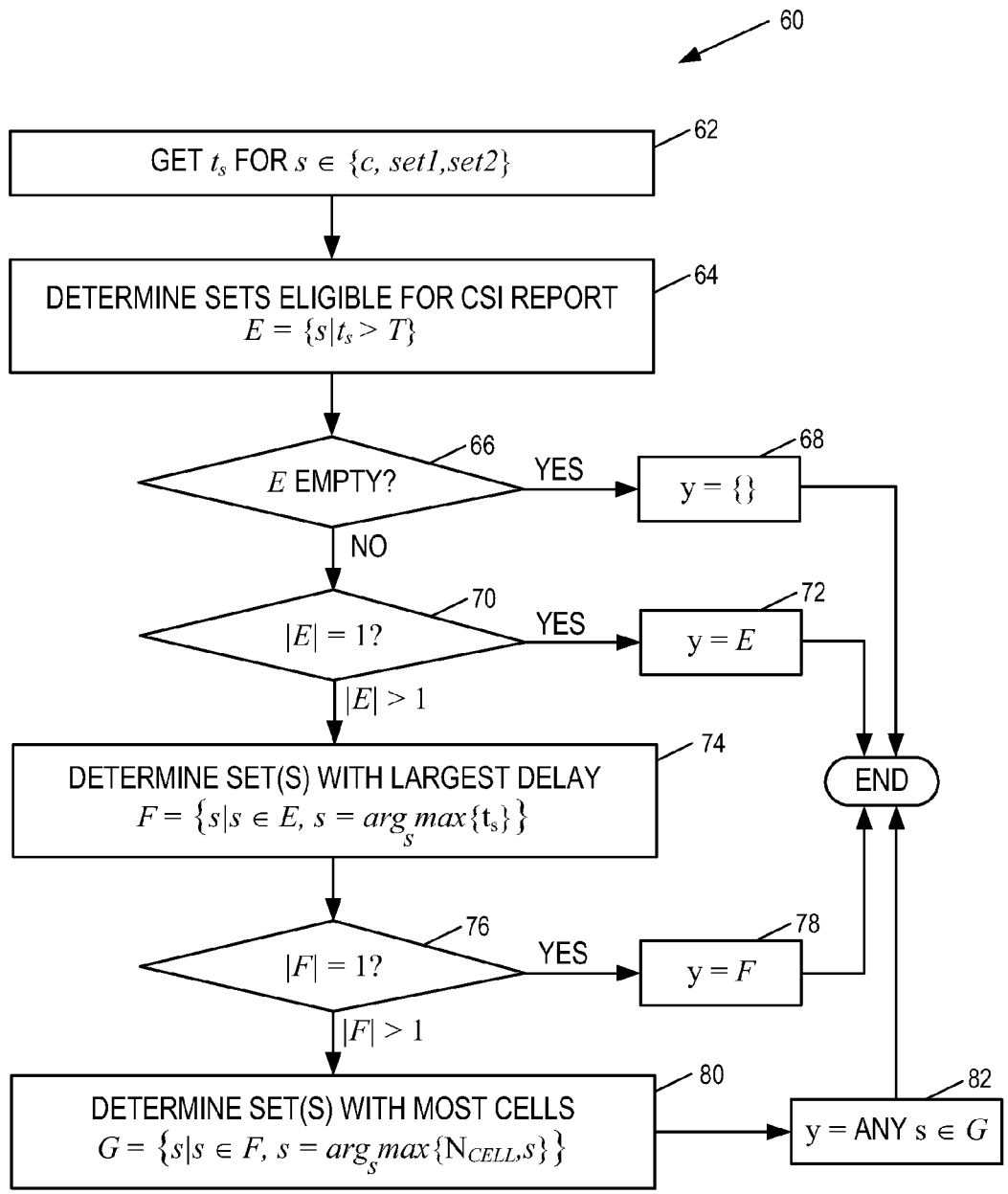
FIG. 6 is a flow diagram of a method of scheduling the sets of cells.

The scheduling is then performed for each subframe, based primarily on the elapsed time since prior CSI reports, and secondarily on the size of the set, as a tie-breaker. The process 60 is descried with reference to FIG. 6, in which y represents the CSI report set scheduled for aperiodic CSI reporting during this subframe. The minimum period of CSI report is one subframe. Denote T the CSI report period in terms of subframes. For each CSI report set s, s∈{c,set1, set2}, let $t_s$ be the time elapsed since a CSI report for s was sent (block 62). The aperiodic CSI report for s is eligible for scheduling if $t_s$ is larger than T (block 64). If no set s is eligible for scheduling (block 66), the set y scheduled for aperiodic CSI reporting is null (block 68) and the process 60 ends. If one set s is eligible for scheduling (block 70), it is scheduled (block 72). If more than one set is eligible for scheduling (block 70), the set(s) having the largest delay, $$s = \mathrm{argmax}_s t_s$$

are determined (block 74). If there is only one set s (block 76), it is scheduled (block 78). If multiple eligible sets have the same maximum $t_s$ (block 76), the set(s) s with the largest number of cells are determined (block 80). A set y is selected at random from this group and scheduled (block 82). That is, if two or more sets s have the same maximum $t_s$ and the same number of cells, one of them is selected randomly.

Bandwidth Allocation for Stand-Alone Aperiodic CSI Reporting

Once a CSI report set is scheduled to be sent, the bandwidth that should be allocated to the transmission of this CSI report must be determined. The bandwidth determination should ensure robust transmission while minimize the bandwidth used.

Since Quadrature Phase Shift Keying (QPSK) is the primary modulation for stand-alone aperiodic CSI transmission (see 3GPP TS 36.313), the robustness of its transmission is primarily determined by the coding rate. For a given CSI payload size, different coding rates for the control information are achieved by allocating a different number of coded symbols or a different number of RBs for its transmission (see 3GPP TS 36.312, "Evolved Universal Terrestrial Radio Access (E-UTRA); Multiplexing and channel coding"). On the other hand, to minimize the number of RBs allocated, the highest possible coding rate that meets a desired transmission quality requirement, as measured for example by the block error rate (BLER), at current uplink channel condition should be selected. According to embodiments of the present invention, the highest practical coding rate is selected indirectly, by minimizing the number of RBs allocated for a given payload size, while maintaining an uplink channel quality metric at or above a predetermined threshold. In one embodiment, the uplink channel quality metric is the SINR.

Hence, the inputs to the bandwidth allocation algorithm are: the desired BLER target, the channel conditions, and the CSI payload size. The output of the bandwidth allocation algorithm is the number $N_{RB}$ of RBs allocated to carry the CSI payload. The inputs are modeled as follows.

BLER Target:

3GPP does not specify a requirement for PUSCH CSI BLER.

However, it is reasonable to use the requirement for PUCCH CSI BLER as the BLER target for aperiodic CSI report on PUSCH. This BLER target is denoted $BLER_{TARGET}$.

Channel Condition:

The channel condition can be represented, for example, by average per-RB Signal to Interference and Noise Ratio (SINR) measured on the PUSCH region. In one embodiment, to take into account the combining gain achieved by multiple antennas, the combined SINR value shall be used. The SINR can be filtered to reduce fluctuations. Although the measured (filtered, average) SINR is used herein to describe embodiments of the invention, in general, the channel condition may be represented by any suitable measured channel quality metric $Z_{MEASURED}$.

CSI Payload Size:

As explained above, the payload size of a stand-alone aperiodic CSI report may range from $O_{CQI, MIN}$ to $O_{CQI, MAX}$. Rather than analyze the bandwidth allocation for each possible CSI size, the CSI size range may be divided into $$M = \left\lceil \frac{O_{CQI,MAX}}{D} \right\rceil$$

intervals, where D is the length of each interval. The right borders of these intervals can be expressed as $O_{CQI}[j]=(j+1)\times D$, $j=0, 1, \ldots, M-1$. The CQI/PMI bit length $O_{CQI}$, $j\times D<O_{CQI}\leq(j+1)\times D$, shall be rounded to $O_{CQI}[j]$, for $j=0, 1, \ldots, M-1$.

The output of the algorithm is the number $N_{RB}$ of RBs allocated to carry the CSI payload. As described above, the allowed numbers of RBs for a multi-cell CSI report are contained in the array B=[1, 2, 3, 4, 5, 6, 8, 9, 10, 12, 15, 16, 18, 20]. In general, the dimension of B is $N_2=14$. In the special case that a CSI report relates only to a single cell, only the first four elements in B are valid, and its dimension is $N_1=4$.

For a given coding rate, there exists a minimum SINR value, denoted the SINR threshold, such that when the SINR equals or exceeds the threshold, the BLER will be less than or equal to the desired BLER target. To achieve efficient bandwidth allocation, we determine first the SINR threshold for each combination of RBs in B and payload size $O_{CQI}$, either by simulation or by operational system measurement. These thresholds are stored in a two-dimensional matrix H[i][j], where i is the index into B, $i=0, 1, \ldots, N-1$, and j is the CSI size index, $j=0, \ldots, M-1$. In practice, usually only a subset of H will be needed. In general, the matrix H[i][j] may comprise any suitable threshold channel quality metrics $Z_{THRESHOLD}$, with the threshold SINR value being one example.

Once a set of CSI report is selected and scheduled for transmission, the following variables are initialized: $N_{CELL}$, the number of serving cells; $O_{CQI}$, the CQI/PMI bit length; and SINR, the current filtered, averaged SINR per RB.

Using $O_{CQI}$, the CSI payload size index J is determined as $$J = \left\lfloor \frac{O_{CQI}}{D} \right\rfloor.$$

Next, based on $N_{CELL}$, an initial index i into the valid numbers of RBs in B is selected, as follows: If $N_{CELL}$ is 1, $i=I_1$, otherwise $i=I_2$, where $I_1$ and $I_2$ are two integers such that $0\leq I_1\leq N_1$ and $0\leq I_2\leq N_2-1$. That is, $I_1$ may index any of the first four values of B; $I_2$ may index any value in B. $I_1$ and $I_2$ are chosen such that $B[I_1]$ and $B[I_2]$ are the most likely bandwidths allocated for CSI reports relating to one cell or multiple cells, respectively. $I_1$ and $I_2$ could be the same if $I_2$ also satisfies $0\leq I_2\leq N_1$.

When the measured SINR is higher than the threshold SINR for B[i] and $O_{CQI}[J]$ (as retrieved from H[i][J]), the number of RBs may be reduced. To achieve this, the next lower number of RBs in B, i.e., B[i-1] is selected. If the SINR is still higher than the threshold SINR retrieved from H[i-1][J], then the next lower number of RBs B[i-2] is selected, and so on.

Conversely, when the measured SINR is lower than the threshold for B[i] and OCQI[J] (as retrieved from H[i][J]), if the UE has not reached its maximum transmission power and B[i] is smaller than the maximum allowed value, $N_{RB}$ is increased. To achieve this, the next higher number of RBs in B, i.e., B[i+1] is selected. If the SINR is still lower than the threshold SINR retrieved from H[i+1][J], then the next higher number of RBs B[i+2] is selected, and so on until either the UE has reached its maximum power, or B[i] has reached its maximum allowed value. The process of increasing NRB stops when one of the following three conditions is true: (1) The SINR becomes higher than or equal to the SINR threshold H[i][J] (for the current i); (2) The UE has reached its maximum power; or (3) The maximum allowed value in B[i] has been reached. The maximum allowed number of RBs is 4 for a CSI report for one cell, and 20 for a CSI report for multiple cells.

When the process stops, if the measured SINR is lower than the threshold SINR for H[i][J], then a higher probability of CRC error is expected. In this case, the delay for the next transmission of the same CSI report set may be reduced. The adjusted delay for the next report is defined as T' where $T'=\lceil(1+\delta)T\rceil$ and where $\delta=BLER(O_{CQI}, B[k], SINR)$ is the expected BLER for the current stand-alone CSI report transmission. The CSI reports are sent more frequently to compensate for the predictable high probability of error, thus better maintaining the overall periodicity of CSI reporting.

Figure 7A:
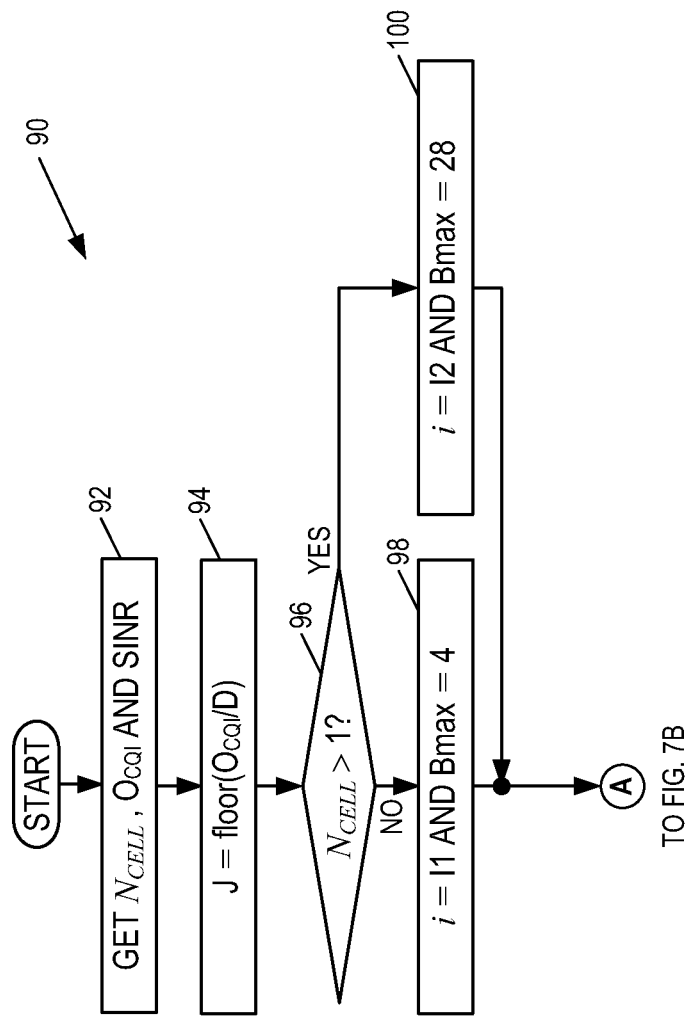
FIGS. 7A and 7B together depict a flow diagram of a method of bandwidth allocation for the set of cells.
Figure 7B:
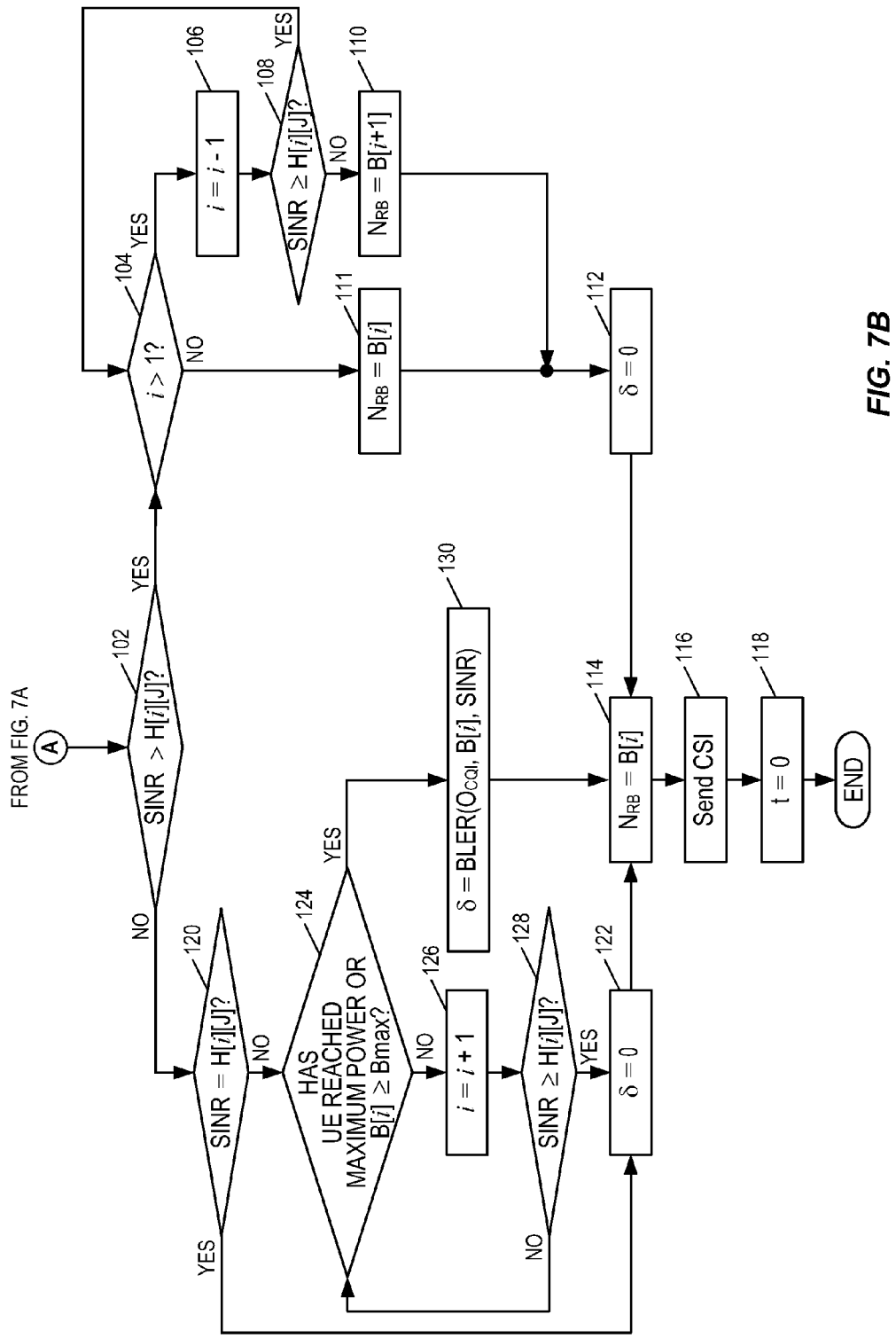

The bandwidth allocation algorithm 90 described above is depicted as a flow diagram in FIG. 7. Initially, information for the values $N_{CELL}$, $O_{CQI}$, and SINR is obtained (block 92). The CSI payload size index J is calculated (block 94). If the CSI report is for only one cell (block 96), the index i into B is initialized to $I_1$ and $B_{MAX}$ is set to 4 (block 98). If the CSI report is for multiple cells (block 96), the index i into B is initialized to $I_2$ and $B_{MAX}$ is set to 20 (block 100). The measured SINR is compared to the threshold SINR for the number of RBs and the payload size, obtained from the matrix H[i][J] (block 102). If the measured SINR exceeds the threshold (block 102), the number of RBs may be reduced, and control flows to the right.

First, if the index i is 1 (block 104), then it cannot be reduced, and $N_{RB}=B[1]=1$ (block 106). If the index i>1 (block 104), then it is decremented (block 106), and the measured SINR is again compared with a threshold SINR (block 108)—which this time is the threshold SINR associated with the lower number of RBs and the same payload size. If the measured SINR meets or exceeds the threshold, the number of RBs is again reduced if possible (blocks 104, 106) and the SINR is compared to a new threshold value (block 108). This process continues iteratively, selecting fewer RBs according to the allowed values in the array B, until the measured SINR fails to match the corresponding threshold SINR (block 108). At that point, $N_{RB}$ is set to the next higher number of RBs B[i+1] (block 110). In either case (i.e., whether block 106 or 110 is executed), the threshold SINR is met, and no shortening of the reporting interval is required. Hence, $\delta$ is set to zero (block 112). The value $N_{RB}$ is set (block 114, although in this case it was already done at block 106 or 110), the CSI report is sent (block 116), and the delay timer for the next CSI report is initialized to zero (block 118).

If, after the initial comparison of measured SINR to threshold SINR (block 102), the measured SINR does not exceed the threshold (block 102), then control flows to the left. If the measured SINR equals the threshold (block 120), then no delay in the reporting interval is required, and $\delta$ is set to zero (block 122). The value $N_{RB}$ is set (block 114), the CSI report is sent (block 116), and the delay timer for the next CSI report is initialized to zero (block 118). If the measured SINR is less than the threshold value retrieved from H[i][J] (block 120), and the UE has not reached maximum power nor has B[i] reached $B_{MAX}$ (block 124), then the number of RBs is increased by incrementing the index i (block 126). This retrieves a new threshold SINR from H[i][J], which is compared to the measured SINR (block 128), and the index i is again increased (block 126) if necessary (block 128) and if possible (block 124). The iterative process of increasing the number of RBs allocated continues, so long as permitted (block 124), until the measured SINR equals or exceeds the corresponding threshold (block 128), when no shortening of the reporting interval is required (block 122). The number of RBs $N_{RB}$ is set (block 114), and the CSI report is transmitted (block 116).

Finally if, during the iteration to increase the number of RBs in an attempt to meet the threshold SINR (blocks 128, 124, 126), either the UE reaches its maximum power or the number of RBs B[i] reaches the maximum allowed $RB_{MAX}$ (block 124), then the CSI reporting interval is shortened, in anticipation of higher CRC errors. In this case, a factor δ is calculated, as a function of the payload size, the number of RBs, and the SINR (block 130), which reduces the reporting interval by (1−δ), as explained above. The number of RBs allocated, $N_{RB}$, is then set (block 114), and the CSI report is transmitted (block 116).

The process 90 of allocating bandwidth thus determines the minimum allowable number RBs in which a given payload size can be transmitted while maintaining a SINR at or above a predetermined threshold for that payload size and number of RBs. This has the effect of forcing selection of the highest possible coding rate that will achieve a target BLER, thus maximizing the efficiency of the UL channel for the CSI report.

Link Adaptation for Stand-Alone Aperiodic CSI Reporting

While the bandwidth allocation process 90 described above achieves good results, the threshold SINR values for each payload size and number of RBs—against which the measured SINR is compared in the bandwidth allocation process—are predetermined, based on prior system measurements or simulations. According to one embodiment of the present invention, the initial bandwidth allocation process 90 is supplemented with a link adaptation refinement which adjusts the measured SINR based on real system conditions. The adjustment is in the form of an outer-loop control system, in which the SINR is step-wise adjusted up or down, based on the results of Cyclic Redundancy Check (CRC) checks by the eNodeB of stand-alone aperiodic CSI reports received from the UE.

Let $SINR_{ADJ}$ be the SINR adjustment for the SINR thresholds for a UE. The $SINR_{ADJ}$ is initialized to $SINR_{ADJ,0}$ when a UE is setup. After initialization, the $SINR_{ADJ}$ is updated by the results of CRC checks. For given BLER target $BLER_{TARGET}$, the following two variables for SINR adjustment are defined:

$$\Delta_{UP} = SINR_{STEP} \times BLER_{TARGET}/(1-BLER_{TARGET}) \text{ and}$$

$$\Delta_{DOWN} = SINR_{STEP}$$

where $SINR_{STEP}$ is a small positive number.

When the CRC check indicates no error, the $SINR_{ADJ}$ is increased by $\Delta_{UP}$. If a CRC check indicates a decoding error, the $SINR_{ADJ}$ is decreased by $\Delta_{DOWN}$. The filtered, average measured SINR described above, which is obtained from the eNodeB measurement of the ULPHY channel, is compensated by $SINR_{ADJ}$, and the resulting adjusted value $SINR_{ADJUSTED}$ is used instead, i.e., $SINR_{ADJUSTED} = SINR + SINR_{ADJ}$. $SINR_{ADJUSTED}$ is bounded by $SINR_{MIN}$ and $SINR_{MAX}$.

Link adaptation outer-loop is an integral controller in control theory. In control theory, it is well known that the interaction of integral and saturations can cause phenomena called windup. The windup happens in link adaptation when $SINR_{ADJUSTED}$ reaches $SINR_{MAX}$ (or $SINR_{MIN}$) and CRC check no errors (or errors) continue to be integrated. $SINR_{ADJ}$ may become very large (or small), i.e., it winds up. However, the value $SINR_{ADJUSTED}$ does not change, since it is held at $SINR_{MAX}$ (or $SINR_{MIN}$). Due to the unconstrained growth of $SINR_{ADJ}$, when conditions change, a very large number of CRC check results in the opposite direction are required before $SINR_{ADJUSTED}$ moves off of $SINR_{MAX}$ (or $SINR_{MIN}$). In one embodiment, back-calculation is used to avoid windup. Back-calculation works as follows: When $SINR_{ADJUSTED}$ saturates, $SINR_{ADJ}$ is recomputed so that its new value yields an $SINR_{ADJUSTED}$ value at its limit.

Figure 8:
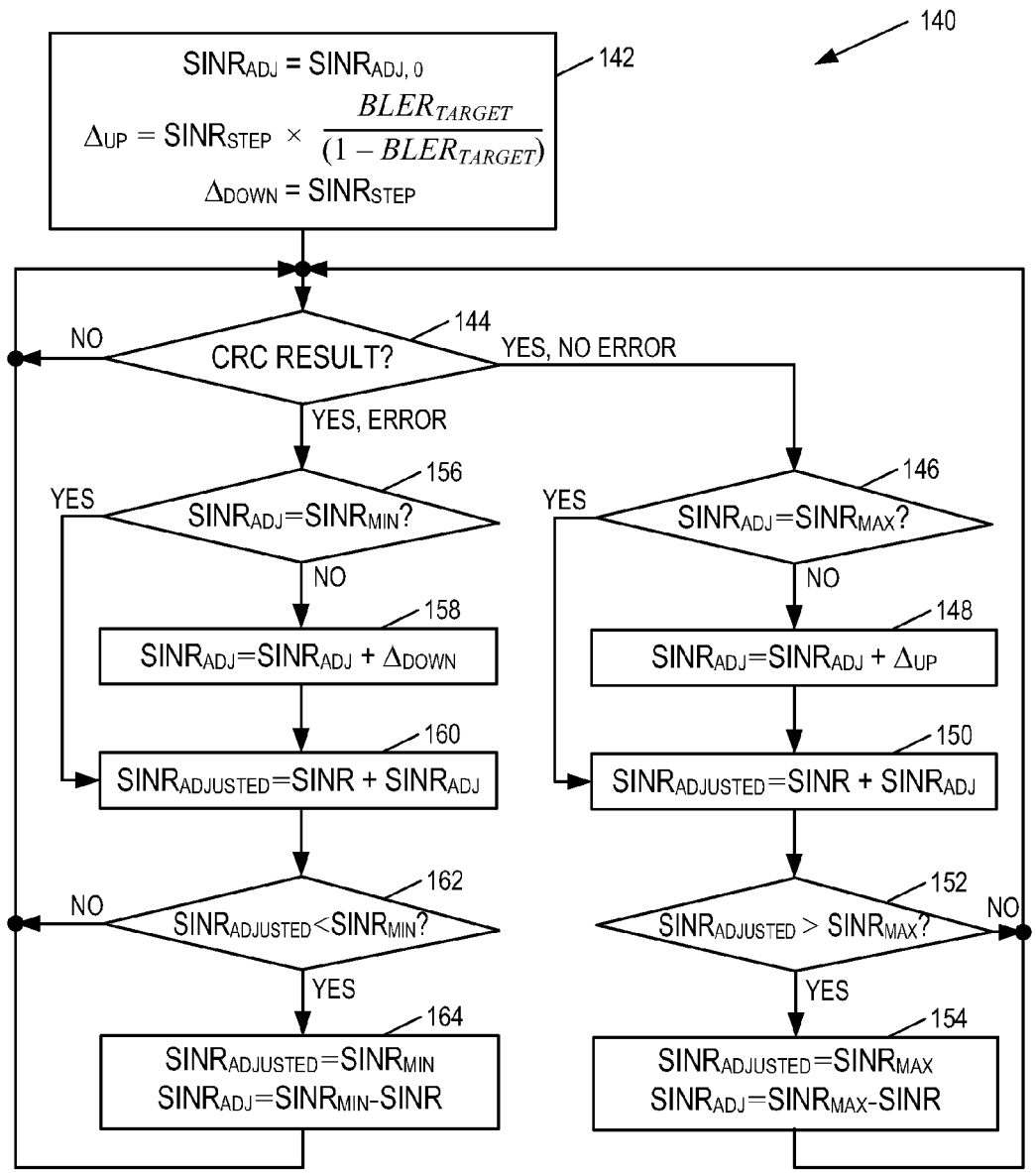
FIG. 8 is a flow diagram of a method of link adaptation for the set of cells.

FIG. 8 depicts a link adaptation process 140 for stand-alone aperiodic CSI reporting by a UE, according to one embodiment of the present invention. Following the initialization step 142, the remainder of the process 140 is performed after every CSI transmission, upon receipt of the result of the eNodeB CRC check. If the CRC check indicates no decoding error, control flows to the right and the SINR is adjusted upward. If the CRC check indicates an error, control flows to the left and the SINR is adjusted downward.

Initially, $SINR_{ADJ}$ is initialized, and $\Delta_{UP}$ and $\Delta_{DOWN}$ are set (block 142), as described above. The process waits at block 144 for the receipt of a CRC check result. When the result of the CRC check indicates no errors occurred, control flows to the right and the SINR is adjusted upward. If $SINR_{ADJ}$ has not yet reached $SINR_{MAX}$ (block 146) then $SINR_{ADJ}$ is increased by $\Delta_{UP}$ (block 148). The measured SINR is then adjusted by $SINR_{ADJ}$ to yield $SINR_{ADJUSTED}$ (block 150). If $SINR_{ADJUSTED}$ has been adjusted above $SINR_{MAX}$ (block 152), then it is set to $SINR_{MAX}$, and $SINR_{ADJ}$ is set to $SINR_{MAX}-SINR$, to prevent wind up of $SINR_{ADJ}$ and hence saturation of $SINR_{ADJUSTED}$. If $SINR_{ADJUSTED}$ does not exceed $SINR_{MAX}$ (block 152), then block 154 is skipped.

When a CRC check result at the eNodeB is received (block 144), and a CRC error occurred, control flows to the left and the SINR is adjusted downward. If $SINR_{ADJ}$ has not yet reached $SINR_{MIN}$ (block 156) then $SINR_{ADJ}$ is decreased by $\Delta_{DOWN}$ (block 158). The measured SINR is then adjusted by $SINR_{ADJ}$ to yield $SINR_{ADJUSTED}$ (block 160). If $SINR_{ADJUSTED}$ has been adjusted below $SINR_{MIN}$ (block 162), then it is set to $SINR_{MIN}$, and $SINR_{ADJ}$ is set to $SINR_{MIN}+SINR$, to prevent wind up of $SINR_{ADJ}$, and hence saturation of $SINR_{ADJUSTED}$, in the negative direction. If $SINR_{ADJUSTED}$ is not below $SINR_{MAX}$ (block 162), then block 164 is skipped Whether the right or left side of the flow diagram of FIG. 8 is executed, upon adjustment of $SINR_{ADJUSTED}$ (and $SINR_{ADJ}$, to prevent wind up), control flows back to block 144 to await another CRC check result from the eNodeB. By adjusting the measured SINR according to actual decoding error experience, the bandwidth allocation process achieves $BLER_{TARGET}$ more accurately than simply comparing the measured SINR to predetermined threshold SINR values.

Stand-Alone Aperiodic CSI Reporting for UE Configured with One SCell

The most straightforward configuration of LTE carrier aggregation (CA)—and one that can be predicted to be the most widely deployed, at least in the near future—is a UE with a serving PCell, that is additionally configured with a single serving SCell. One embodiment of the present invention, presents a process for stand-alone aperiodic CSI reporting for this particular configuration.

Recall the 3GPP Release 10 specification of the CSI request field of a UL grant, listed above in Table 1. Two bits are encoded to indicate no CSI report; aperiodic CSI report for the serving cell c (that is, the cell issuing the UL grant); aperiodic CSI report for a first set of serving cells; or aperiodic CSI report for a second set of serving cells—where the sets of serving cells are configured in the UE by higher layers.

In the particular CA configuration of one PCell and one SCell, the first set contains one serving cell, which is the opposite of that which issues the UL grant, and the second set includes both the PCell and the SCell. For example, if the PCell issues a UL grant, the CSI request field may request no CSI report; aperiodic CSI report for cell c (PCell); aperiodic CSI report for the first set (SCell); or aperiodic CSI report for the second set (PCell and SCell). This assignment of the first and second sets provides the flexibility to schedule a CSI report for both serving cells if the channel condition is good, or to schedule a CSI report for only one cell if the channel condition is bad. Either single cell may be selected (i.e., serving cell c or the first set).

A fixed number of RBs are be used for stand-alone aperiodic CSI reporting in this CA configuration. Consequently, the coding rate of CSI report shall be uniquely determined by the payload sizes of CSI report sets. Therefore, for a given BLER target, each set has a different SINR threshold, based on its payload, to achieve the target BLER. The fixed number of RBs used must be less than or equal to four, since they will be used for CSI report for one cell or two cells. Continuing the notation developed above, the number of allowed RBs is $B[I]$, $0 \leq I \leq N_1$.

Let $t_{PCell}$ and $t_{SCell}$ denote the time elapsed since last aperiodic CSI report transmitted for PCell and SCell, respectively. The link adaptation outer-loop adjustment described above shall also be used in this algorithm. If at least one of $t_{PCell}$ and $t_{SCell}$ is greater than or equal to the aperiodic CSI reporting period T (in subframes), then one aperiodic CSI report shall be triggered. If $SINR_{ADJUSTED}$ is higher than the threshold SINR for the second set, then the second set shall be scheduled; otherwise, the cell with larger CSI report delay shall be scheduled for reporting.

Figure 9:
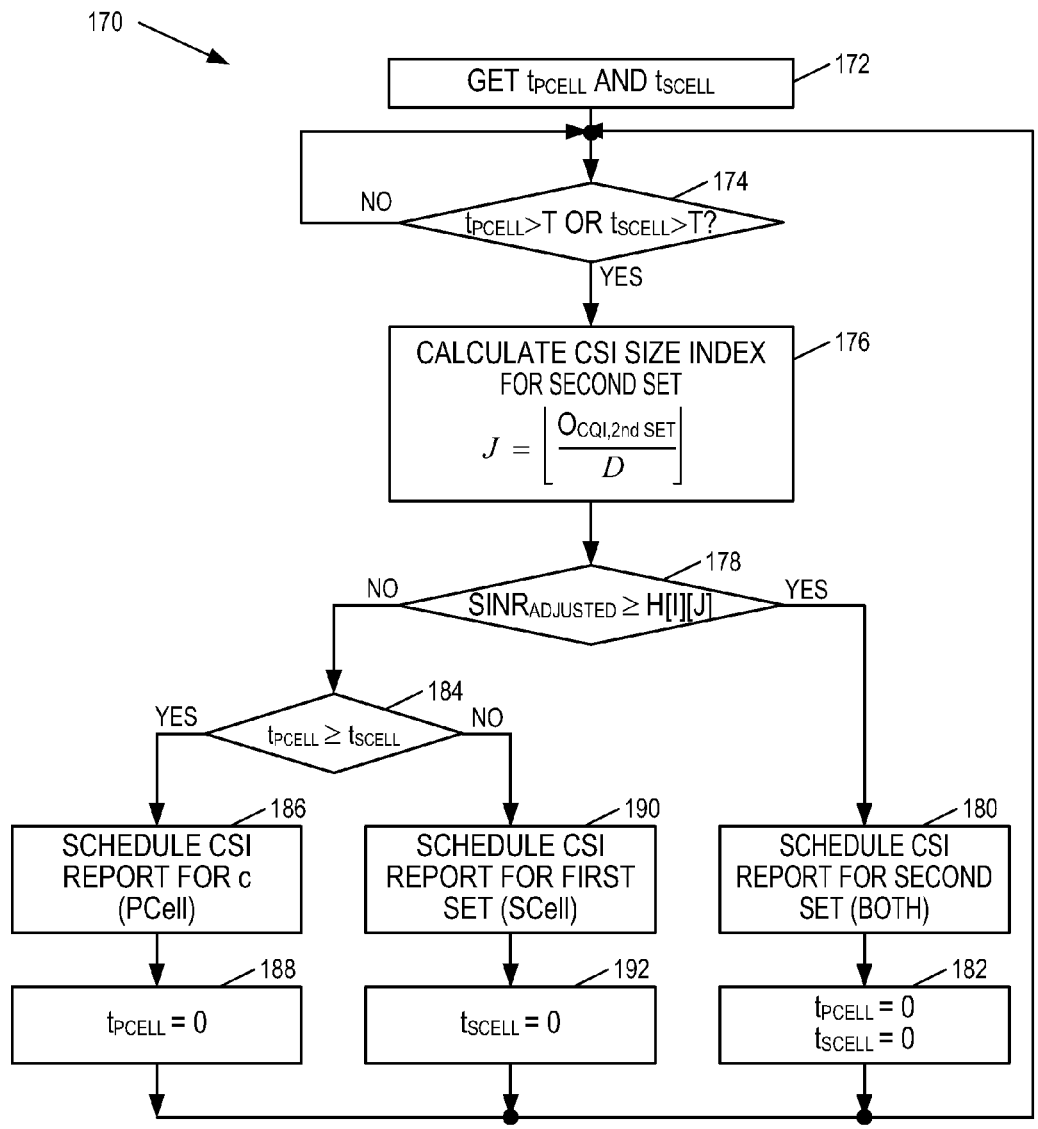
FIG. 9 is a flow diagram of a method of CSI reporting for a UE configured with one SCell.

FIG. 9 depicts a scheduling process 170 for stand-alone aperiodic CSI reporting by a UE in CA with one PCell and one SCell, according to one embodiment of the present invention. Initially, the delays $t_{PCell}$ and $t_{SCell}$ since the last aperiodic CSI reports for the PCell and SCell, respectively, are obtained (block 172). Both of these values are compared to the CSI reporting period T (block 174). If neither delay is greater than T, the process 170 waits. If either delay is greater than T, the CSI size index for the payload of the second set (both PCell and SCell CSI reports) is calculated (block 176). $SINR_{ADJUSTED}$ calculated as described above) is compared to the SINR threshold, obtained from $H[I][J]$, for the $N_{RB}$ and payload size (block 178). If the adjusted SINR exceeds the threshold, the channel quality is good, and CSI reports for both PCell and SCell are transmitted by scheduling the second set (block 180). These are sent, and the delays $t_{PCell}$ and $t_{SCell}$ are both reset (block 182). The process 170 then returns to wait for the expiration of another CSI reporting period T (block 174).

If $SINR_{ADJUSTED}$ is less than the SINR threshold (block 178), the channel quality is insufficient to report CSI for both cells, and CSI is reported for only one of PCell and SCell. The delays since the last CSI reports for each serving cell are compared (block 184). If PCell has the largest delay (or if they are equal), a CSI report for only the PCell is scheduled by issuing a CSI request denoting cell c (block 186). The PCell CSI report is sent, the delay $t_{PCell}$ is reset (block 188), and the process 170 returns to monitor CSI report delays (block 174). If the delay since the last CSI report for SCell is greater than that for PCell (block 184), then a CSI report for only the SCell is scheduled by issuing a CSI request denoting the first set, which contains only SCell (block 190). The SCell CSI report is sent, the delay $t_{SCell}$ is reset (block 192), and the process 170 returns to monitor CSI report delays (block 174).

Apparatus for Implementing Inventive Processes

The processes described above—allocation of serving cells into sets and scheduling of CSI reports; bandwidth allocation; and link adaptation (including the special cases of these processes in the case of only one PCell and one SCell)—are performed in network nodes, such as the eNodeB for the serving cell c, which issues CSI requests to the UE in the form of scheduling grants. Of course, the UE additionally performs measurements and reports to the network information relevant to the inventive processes.

Figure 10:
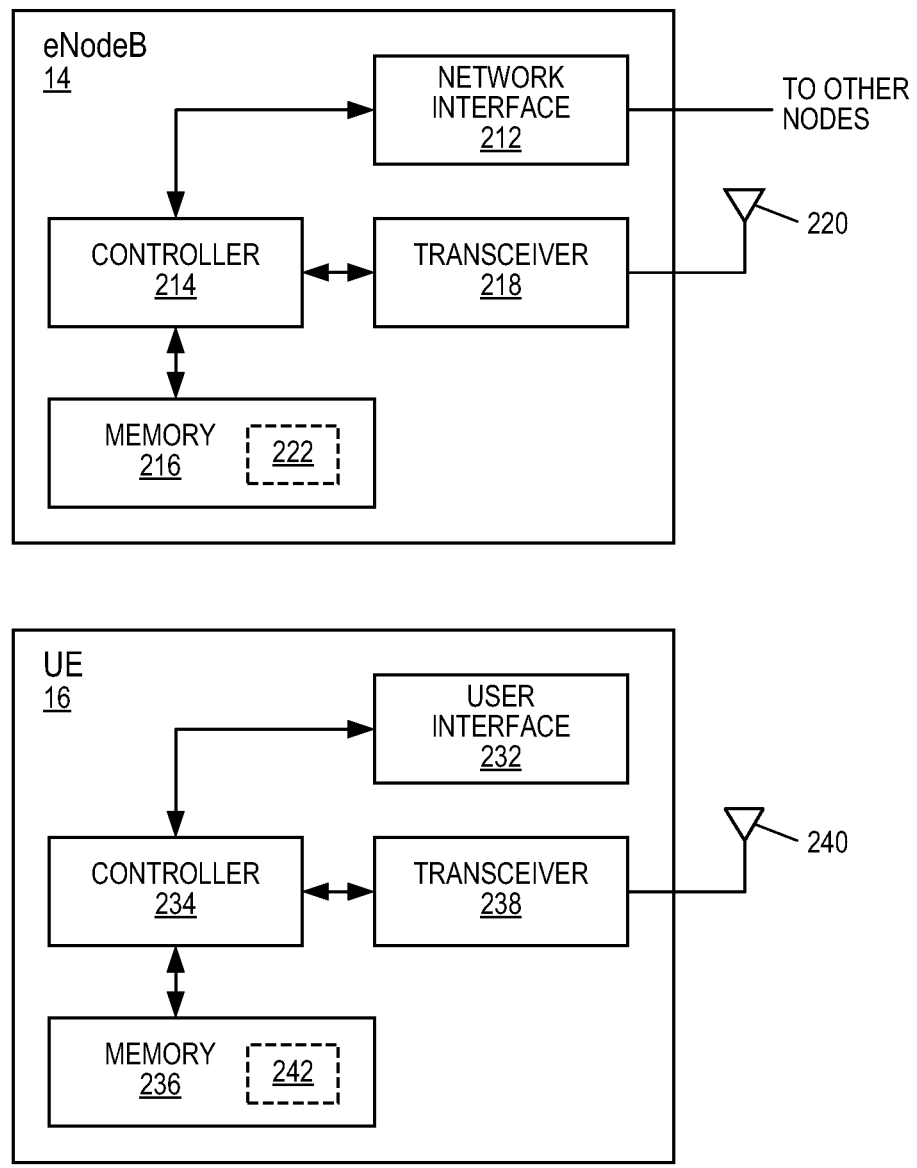
FIG. 10 is a functional block diagram of a network node and a UE.

FIG. 10 depicts functional block diagrams of a network node, such as an eNodeB 14, and a UE 16 operative to implement the stand-alone, aperiodic CSI reporting processes described above. The eNodeB 14 is a network node providing wireless communication services to one or more UE 16 in a geographic region (known as a cell or sector, not to be confused with the term cell used herein to refer to component carriers in CA). The eNodeB 14 includes communication circuitry 212 operative to exchange data with other network nodes; a controller 214; memory 216; and radio circuitry, such as a transceiver 218, one or more antennas 220, and the like, to effect wireless communication across an air interface to one or more UE 16. According to embodiments of the present invention, the memory 216 is operative to store, and the controller 214 operative to execute, software 222 which when executed is operative to cause the eNodeB 14 to perform processes and functions described herein. In some embodiments, the processes described herein may be performed in network nodes other than the eNodeB 14, with the relevant information and commands being transmitted through an eNodeB 14 to the UE 16. In general, such nodes may be configured similarly to the eNodeB 14 depicted in FIG. 10, with the possible omission of the transceiver 218 and antennas 220.

FIG. 10 also depicts a UE 16 operative in embodiments of the present invention. As those of skill in the art are aware, a UE 16 is a device, which may be battery-powered and hence mobile, operative within a wireless communication network 10. The UE 16 includes a user interface 232 (display, touchscreen, keyboard or keypad, microphone, speaker, and the like); a controller 234; memory 236; and a radio circuitry, such as one or more transceivers 238, antennas 240, and the like, to effect wireless communication across an air interface to one or more eNodeBs 14. The UE 16 may additionally include features such as a camera, removable memory interface, short-range communication interface (Wi-Fi, Bluetooth, and the like), wired interface (USB), and the like (not shown in FIG. 10). According to embodiments of the present invention, the memory 236 is operative to store, and the controller 234 operative to execute, software 242 which when executed is operative to cause the UE 16 to perform, or support, processes and functions described herein.

In all embodiments, the controller 214, 234 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 216, 236 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuitry may comprise one or more transceivers 218, 238 used to communicate with one or more other transceivers 218, 238 via a Radio Access Network according to the LTE protocol. The transceiver 218, 238 implements transmitter and receiver functionality appropriate to the Radio Access Network links (e.g., frequency allocations and the like). The transmitter and receiver functions may share circuit components and/or software, or alternatively may be implemented separately.

In all embodiments, the communication circuitry 212 may comprise a receiver and transmitter interface used to communicate with one or more other nodes over a communication network according to one or more communication protocols known in the art or that may be developed, such as SIP, TCP/IP, Ethernet, SONET, ATM, or the like. The communication circuitry 212 implements receiver and transmitter functionality appropriate to the communication network links (e.g., optical, electrical, and the like). The transmitter and receiver functions may share circuit components and/or software, or alternatively may be implemented separately.

Advantages of Embodiments of the Present Invention

Embodiments of the present invention present numerous advantages over prior art methods of scheduling and implementing stand-alone, aperiodic CSI report transmissions. Fairness of CSI reporting for different serving cells is achieved by using a load balancing policy to construct the CSI report sets, and by using a "largest delay first" strategy for the selection of CSI report set to be transmitted. A simple and efficient bandwidth allocation, based on the CSI payload size and current channel conditions, achieves optimal spectral efficiency by indirectly selecting the highest coding rate supportable to achieve a target BLER. To optimize the bandwidth allocation process to current, real-world conditions, a link adaptation process uses an outer-loop SINR adjustment to adapt to time-varying wireless channel conditions. A compensation method maintains a stable CSI report interval when SINR is low. Finally, a simplified approach is presented for the specific (but common) case when a UE is configured with a single SCell.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a bandwidth allocation processing circuit in a node of a 3GPP Long Term Evolution (LTE) wireless communication network, of allocating bandwidth for a User Equipment (UE) in carrier aggregation to transmit a stand-alone, aperiodic Channel State Information (CSI) report, the method comprising:
determining a number of cells for which the UE is to transmit a CSI report, a payload size of the CSI report, and a measured uplink channel quality metric $Z_{MEASURED}$;
in response to the number of cells, selecting an initial number of resource blocks (RB) that can be allocated for a CSI report, and a maximum allowable number of RBs;
comparing $Z_{MEASURED}$ to a predetermined threshold channel quality metric $Z_{THRESHOLD}$ for a currently selected number of RBs and the payload size;
in response to each comparison, decreasing the number of RBs selected if $Z_{MEASURED} > Z_{THRESHOLD}$ and increasing the number of RBs selected if $Z_{MEASURED} < Z_{THRESHOLD}$ and repeating the comparison with the $Z_{THRESHOLD}$ obtained using the currently selected number of RBs; and
allocating the currently selected number of RBs for transmission of the CSI report
if $Z_{MEASURED} = Z_{THRESHOLD}$,
if $Z_{MEASURED} > Z_{THRESHOLD}$ and decreasing the number of RBs would cause $Z_{MEASURED} < Z_{THRESHOLD}$, or
if $Z_{MEASURED} < Z_{THRESHOLD}$ and either the UE has reached maximum power or the currently selected number of RBs is the maximum allowable number of RBs.

2. The method of claim 1 wherein the channel quality metric Z is a Signal to Interference and Noise Ratio (SINR).

3. The method of claim 2 wherein the measured SINR is an average, filtered, per-RB SINR measured on an uplink physical channel.

4. The method of claim 1 wherein selecting an initial number of RBs that can be allocated for the CSI report comprises selecting an initial index i into an array of allowable numbers of RBs that can be allocated for the CSI report, and wherein increasing or decreasing the number of RBs comprises increasing or decreasing the index i, respectively.

5. The method of claim 4 further comprising dividing a range of possible sizes of the CSI report payload into a plurality of intervals and approximating the size of a payload by an index J identifying the number of full intervals in the payload.

6. The method of claim 5 further comprising
obtaining a threshold channel quality metric $Z_{THRESHOLD}$ for each allowable number of RBs and each possible approximated payload size range, and storing the values of $Z_{THRESHOLD}$ in a two-dimensional matrix H; and
wherein comparing $Z_{MEASURED}$ to the $Z_{THRESHOLD}$ for the currently selected number of RBs and the payload size comprises indexing the matrix H with the indices i and J to obtain a $Z_{THRESHOLD}$ value, and comparing that value to $Z_{MEASURED}$.

7. The method of claim 1 further comprising, if $Z_{MEASURED} < Z_{THRESHOLD}$ and either the UE has reached maximum power or the currently selected number of RBs is the maximum allowable number of RBs, advancing the next transmission of the CSI report by an amount determined as a function of the payload size, the allocated number of RBs, and $Z_{MEASURED}$.

8. The method of claim 1 further comprising:
   decoding a received CSI report;
   if a decoding error occurs, decreasing a channel quality adjustment factor $Z_{ADJ}$ by a first predetermined step size, down to a predetermined minimum value; and
   if no decoding error occurs, increasing $Z_{ADJ}$ by a second predetermined step size, up to a predetermined maximum value; and
   adjusting $Z_{MEASURED}$ by $Z_{ADJ}$.

9. The method of claim 8 further comprising limiting the size of $Z_{ADJ}$ to avoid wind up.

10. A method of transmitting a stand-alone, aperiodic Channel State Information (CSI) report from a User Equipment (UE) in carrier aggregation wherein the UE is assigned one primary cell (PCell) and one secondary cell (SCell), the method performed by a processing circuit in a node of a 3GPP Long Term Evolution (LTE) wireless communication network and comprising:
   assigning SCell to a first set of serving cells;
   assigning both PCell and SCell to a second set of serving cells;
   determining a number of resource blocks (RB) to be used to transmit a CSI report;
   determining a payload size of a CSI report for the second set;
   determining a threshold channel quality metric $Z_{THRESHOLD}$ for the second set, based on the payload size;
   monitoring times elapsed since the last aperiodic CSI report from the UE for PCell and SCell;
   obtaining a measured uplink channel quality metric $Z_{MEASURED}$;
   comparing $Z_{MEASURED}$ to $Z_{THRESHOLD}$;
   if $Z_{MEASURED} >= Z_{THRESHOLD}$ requesting the CSI report from the UE for the second set; and
   if $Z_{MEASURED} < Z_{THRESHOLD}$ requesting the CSI report from the UE for the one of PCell and SCell having the longest elapsed time since the last report;
   wherein requesting the CSI report comprises issuing a scheduling grant, containing a CSI request, from the serving cell other than that in the first set, the CSI request specifying one of the requesting cell, the first set, or the second set.

11. The method of claim 10 further comprising:
   decoding a received CSI report;
   if a decoding error occurs, decreasing a channel quality adjustment factor $Z_{ADJ}$ by a first predetermined step size, down to a predetermined minimum value; and
   if no decoding error occurs, increasing $Z_{ADJ}$ by a second predetermined step size, up to a predetermined maximum value; and
   adjusting $Z_{MEASURED}$ by $Z_{ADJ}$.

12. A node operative in a 3GPP Long Term Evolution (LTE) wireless communication network and operative to perform a process of allocating bandwidth for a User Equipment (UE) in carrier aggregation to transmit a stand-alone, aperiodic Channel State Information (CSI) report, the node comprising:
   a network communication interface;
   a wireless transceiver operatively connected to one or more antenna;
   a controller circuit operatively connected to the network communication interface and wireless transceiver; and
   memory operatively connected to the controller circuit;
   wherein the controller circuit is operative to
      determine a number of cells for which the UE is to transmit a CSI report, a payload size of the CSI report, and a measured uplink channel quality metric $Z_{MEASURED}$;
      in response to the number of cells, select an initial number of resource blocks (RB) that can be allocated for the CSI report, and a maximum allowable number of RBs;
      compare $Z_{MEASURED}$ to a predetermined threshold channel quality metric $Z_{THRESHOLD}$ for the currently selected number of RBs and the payload size;
      in response to each comparison, decrease the number of RBs selected if $Z_{MEASURED} > Z_{THRESHOLD}$ and increase the number of RBs selected if $Z_{MEASURED} < Z_{THRESHOLD}$ and repeat the comparison with the $Z_{THRESHOLD}$ obtained using the currently selected number of RBs; and
      allocate the currently selected number of RBs for transmission of the CSI report
         if $Z_{MEASURED} = Z_{THRESHOLD}$,
         if $Z_{MEASURED} > Z_{THRESHOLD}$ and decreasing the number of RBs would cause $Z_{MEASURED} < Z_{THRESHOLD}$, or
         if $Z_{MEASURED} < Z_{THRESHOLD}$ and either the UE has reached maximum power or the currently selected number of RBs is the maximum allowable number of RBs.

13. The node of claim 12 wherein the channel quality metric Z is a Signal to Interference and Noise Ratio (SINR).

14. The node of claim 13 wherein the measured SINR is an average, filtered, per-RB SINR measured on an uplink physical channel.

15. The node of claim 12 wherein the controller circuit is operative to select the initial number of RBs that can be allocated for the CSI report by selecting an initial index i into an array of allowable numbers of RBs that can be allocated for the CSI report, and wherein increasing or decreasing the number of RBs comprises increasing or decreasing the index i, respectively.

16. The node of claim 15 wherein the controller circuit is further operative to divide a range of possible sizes of the CSI report payload into a plurality of intervals and approximate the size of a payload by an index J identifying the number of full intervals in the payload.

17. The node of claim 16 wherein the controller circuit is further operative to
   obtain a threshold channel quality metric $Z_{THRESHOLD}$ for each allowable number of RBs and each possible approximated payload size, and store the values of $Z_{THRESHOLD}$ in a two-dimensional matrix H; and
   the controller circuit is operative to compare $Z_{MEASURED}$ to a predetermined threshold channel quality metric $Z_{THRESHOLD}$ for the currently selected number of RBs and the payload size by indexing the matrix H with the indices i and J to obtain a $Z_{THRESHOLD}$ value, and comparing that value to $Z_{MEASURED}$.

18. The node of claim 12 wherein the controller circuit is further operative to, if $Z_{MEASURED} < Z_{THRESHOLD}$ and either the UE has reached maximum power or the currently selected number of RBs is the maximum allowable number of RBs, delay the transmission of the CSI report by an amount determined as a function of the payload size, the allocated number of RBs, and $Z_{MEASURED}$.

19. The node of claim 12 wherein the controller circuit is further operative to:
  decode a received CSI report;
  if a decoding error occurs, decrease a channel quality adjustment factor $Z_{ADJ}$ by a first predetermined step size, down to a predetermined minimum value; and
  if no decoding error occurs, increase $Z_{ADJ}$ by a second predetermined step size, up to a predetermined maximum value; and
  adjust $Z_{MEASURED}$ by $Z_{ADJ}$.

20. The node of claim 19 wherein the controller circuit is further operative to limit the size of $Z_{ADJ}$ to avoid wind up.

21. A node operative in a 3GPP Long Term Evolution (LTE) wireless communication network and operative to perform a process of allocating bandwidth for a User Equipment (UE) in carrier aggregation to transmit a stand-alone, aperiodic Channel State Information (CSI) report, wherein the UE is assigned one primary cell (PCell) and one secondary cell (SCell), the node comprising:
  a network communication interface;
  a wireless transceiver operatively connected to one or more antenna;
  a controller circuit operatively connected to the network communication interface and wireless transceiver; and
  memory operatively connected to the controller circuit;
  wherein the controller circuit is operative to
    assign one of the PCell and the SCell to a first set of serving cells;
    assign both PCell and SCell to a second set of serving cells;
    determine a number of resource blocks (RB) to be used to transmit the CSI report;
    determine a payload size of the CSI report for the second set;
    determine a threshold channel quality metric $Z_{THRESHOLD}$ for the second set, based on the payload size;
    monitor times elapsed since the last aperiodic CSI report from the UE for PCell and SCell;
    obtain a measured uplink channel quality metric $Z_{MEASURED}$;
    compare $Z_{MEASURED}$ to $Z_{THRESHOLD}$;
    if $Z_{MEASURED} >= Z_{THRESHOLD}$ request a CSI report from the UE for the second set; and
    if $Z_{MEASURED} < Z_{THRESHOLD}$ request a CSI report from the UE for the one of PCell and SCell having the longest elapsed time since the last report;
    wherein requesting a CSI report comprises issuing a scheduling grant, containing a CSI request, from the serving cell other than that in the first set, the CSI request specifying the requesting cell, the first set, or the second set.

22. The node of claim 21 wherein the controller circuit is further operative to decode a received CSI report;
  if a decoding error occurs, decrease a channel quality adjustment factor $Z_{ADJ}$ by a first predetermined step size, down to a predetermined minimum value; and
  if no decoding error occurs, increase $Z_{ADJ}$ by a second predetermined step size, up to a predetermined maximum value; and
  adjust $Z_{MEASURED}$ by $Z_{ADJ}$.

* * * * *